Patented Sept. 19, 1944

2,358,619

UNITED STATES PATENT OFFICE 2,358,619

METHOD FOR RECONDITIONING USED SOLUTIZER SOLUTIONS

Lawson E. Border, Alton, Ill., assignor to Shell Development Company, San Francisco, Calif., a corporation of Delaware No Drawing. Original application June 9, 1941, Serial No. 397,212. Divided and this application December 7, 1942, Serial No. 468,327

6 Claims. (Cl. 252—192)

This invention is a division of my application Serial No. 397,212 filed June 9, 1941 now U. S. Patent No. 2,315,480, and relates to the art of refining hydrocarbons by extraction with so-called solutizer solutions, and more particularly to a method for reconditioning solutizer solution. Specifically it is concerned with a method for treating a contaminated solutizer solution with flocculent solids, whereby gums and resinous emulsifiers are removed.

The solutizer process by means of which mercaptans and other weak organic acids contained in sour hydrocarbon distillates, and more particularly in gasoline distillates, are extracted with aqueous solutions of alkali metal hydroxides containing solutizers is well known. (See references infra.)

Among the several compounds particularly suitable as solutizers for weak organic acids are the following: aliphatic alkanolamines and amino alkylamines in which the alkylene radicals contain 2 to 3 carbon atoms; diamino alcohols, glycols and amino glycols of 3 to 5 carbon atoms; alkyl glycerines in which the number of carbon atoms in the alkyl radical is from 1 to 4; mono alkyl ethers of glycerine in which the alkyl radical has from 1 to 3 carbon atoms; diamino, dihydroxy, or amino hydroxy alkyl ethers, thioethers or imino ethers in which the alkyl radicals have from 2 to 3 carbon atoms; alkali and particularly potassium salts of fatty acids having from 1 to 6 carbon atoms, or of amino or hydroxy fatty acids having from 3 to 7 carbon atoms, or of phenyl acetic acid, or of dicarboxylic acids having from 5 to 11 carbon atoms in which the carboxyl radicals are separated by at least two carbon atoms, or of phenol or alkyl phenols; mixtures of the above and particularly mixtures with gum inhibitors soluble in aqueous caustic alkali solutions. Outstanding among the above are the salts, because in the regeneration of the spent solution containing absorbed weak organic acids by steam stripping, salts are substantially non-volatile.

The solutizing process and the various solutizers enumerated also have been described in a series of patents and patent applications, as well as in the general literature; for example, in the Yabroff et al. U. S. Patents 2,149,379; 2,149,380; 2,152,166; 2,152,720; 2, 152,723; 2,164,- 851; 2,186,398; 2,202,039; 2,223,798; 2,229,995; in Refiner and Natural Gasoline Manufacturer, May 1939, pages 171 to 176 and March 1940, pages 73 to 76; Industrial and Engineering Chemistry, vol. 32, pages 257 to 262, February 1940; Chemical and Metalurgical Engineering, vol. 47, pages 776 to 778, November 1940; Oil and Gas Journal, vol. 39, No. 26, pages 55 to 56, November 7, 1940; etc.

In principle, a solutizer solution could be used indefinitely by continually regenerating it as by steaming. In practice, however, solutions used a long time tend to form relatively stable emulsions with the hydrocarbon oil under treatment, probably due to gradual accumulation of emulsifiers believed to be resinous substances, which emulsions either reduce the throughput due to retarded settling or cause the carry-over of valuable solutizer. Coalescing the entrained droplets by contact with fine steel wool or other solids may not always remedy the situation. It is in such solutions used continuously and for a very long period in a solutizer plant that my reconditioning process is particularly useful.

The exact source and chemical composition of the emulsifier are not known. It appears to be a gummy material of a resinous nature. Possible sources of it include cracked gasoline feeds containing dissolved gums, oxidation of portions of solutizer solution such as alkyl phenols which may purposely form part of the solutizer solution or which may accumulate in solutizer solutions when cracked gasoline feeds are treated.

The object of this invention is to facilitate the treatment of hydrocarbon distillates by means of solutizer solutions. Another purpose is to decrease the costs of operation in solutizer plants by minimizing or preventing losses of valuable solutizer which are suffered when contaminated solution must be discarded. Still another purpose is to decrease emulsion and foaming difficulties in solutizer plants. A more particular purpose is to provide a method for the removal of resinous emulsifiers and troublesome solids from used solutizer solutions.

My invention is based on the discovery that resinous emulsifiers which accumulate in used solutizer solutions may be removed by subjecting the said alkaline solutizer solution to a treatment with flocculent solids, thus rendering said solution clean and again suitable for use in the solutizer process for the extraction of mercaptans.

In carrying out my invention, a contaminated solutizer solution containing a resinous emulsifier is subjected to a treatment with flocculent solids, the flocculent material together with the resinous emulsifier and solids which are carried down by the flocs are separated, and the resulting clean solutizer solution is removed, ready to be re-used.

By a contaminated solutizer solution I mean one containing an emulsifier which has slowly accumulated during the treatment and which is in solution or colloidally dispersed thereby causing said solution to have a tendency to form emulsions which may be relatively stable when it is mixed with gasoline in the course of the treatment or to foam excessively when the spent solution is being stripped, thereby hampering the smooth operation of a solutizer plant.

The flocculent solids used in the process may be either preformed or formed in situ. By the former, I mean metal salts and hydroxides which are floccular in form when precipitated from aqueous solutions; by the latter, those metal salts and hydroxides which form flocs when solutions or slurries of them are contacted with solutizer solutions. Suitable floccular substances are less than 1% soluble in pure water at normal room temperature, are substantially inert under the conditions of the treatment, and are insoluble in relatively concentrated alkali metal hydroxide. Particularly suitable are floccular hydroxides of Ca, Cd, Cu, Cr, Fe, Ni, the carbonates or phosphates of the alkali earth metals and lead, and the sulfates of Ca, Ba and Pb when in floccular form. Heavy metal sulfides in general do not readily form flocs and therefore are usually less effective.

Treatment with flocs also includes treatments with solutions such as lime water, hard tap water, etc., which form flocs when added to the contaminated solutizer solution. For example, hard tap water or lime water, i. e. saturated solution of slaked lime, when added to contaminated solutizer solution forms flocs which carry down with them the resinous emulsifier and any of the troublesome solids present.

Flocs may also be produced by introducing a solution of water-soluble salt which will form a hydroxide floc when contacted with the concentrated alkaline solutizer solution. However, this method has the disadvantage of converting free KOH or NaOH of the solutizer solution to the corresponding salt, and therefore in general is less desirable.

The solution and the flocs should be intimately contacted so as to cause the entrainment of the resinous emulsifier with the floc, thereby permitting the separation of the emulsifier from the cleansed solutizer solution. Where preformed slurries are used the mixture should be agitated as by blowing. Conventional methods of separation such as settling, decanting, filtering, etc. are generally suitable. The contacting may be continuous or batchwise, and may be resorted to whenever the emulsifier content has built up to proportions which under the particular treating conditions in the plant may cause difficulties.

In order to avoid slow or incomplete settling, two independent factors must be considered; they are dilution of solutizer solution and the quantity of lime water introduced. Solutizer solution at the time the lime water is introduced should contain alkali metal hydroxide in a concentration preferably not greater than 3N. Thus when starting out with solutizer solution which contains alkali metal hydroxide in concentration of above 3N such as about 6N as most frequently used, it is desirable to carry out any precipitation in a dilution of at least 1:1 solutizer solution to water. However, when using lime water, insufficient amounts of floc may be formed at this dilution. 2 to 5 parts of lime water per part of solutizer solution normally are required, when using a saturated solution of lime substantially free from undissolved lime. However, when using a lime slurry containing substantial amounts of undissolved lime, it is often possible to obtain satisfactory cleansing at a dilution of only 1:1.

After completed treatment it is usually necessary to reconcentrate the solutizer solution to the original concentration by boiling off water of dilution.

The following explanation and example illustrate the effectiveness of my treatment:

When solutizer solution and gasoline are passed in countercurrent flow through an extraction tower in which the aqueous phase is continuous, an emulsion of the oil-in-water type is formed and collects at the top of the solutizer solution. A similar type of emulsion can be formed by stirring solutizer solution and gasoline together, and a stirrer test was accordingly devised whereby small amounts of solutizer solution and gasoline could be caused to form an emulsion under controlled conditions, and the time of settling measured.

A full-range cracked gasoline was stirred vigorously with a contaminated aqueous solutizer solution containing potassium hydroxide 6N, potassium isobutyrate 1.6N, and potassium phenolate 0.7N under standard conditions. The settling time (time necessary for separation of the two phases) was 20 minutes with a rag which persisted for over 30 minutes. Another portion of the same contaminated solutizer solution was treated with an equal volume of lime slurry, equivalent to 0.4N $Ca(OH)_2$. The mixture was centrifuged for 10 minutes at 1500 R. P. M. and then filtered through a sintered glass filter. The filtered solution was then stirred with a full-range cracked gasoline and the settling time was found to have dropped to 5 minutes. The solutions separated cleanly and no rag remained.

I claim as my invention:

1. A process for purifying a contaminated aqueous alkali metal hydroxide solution containing a solutizer for mercaptans which solution was used to extract weak acids from a sour hydrocarbon distillate and regenerated by steam stripping whereby resinous emulsifiers accumulated in the aqueous solution comprising contacting said aqueous solution with at least an equal volume of lime water to entrain resinous emulsifier with the resulting flocculent solid, separating said flocculent solid containing entrained emulsifier from said solution, the latter having retained said solutizer for mercaptans, and reconcentrating.

2. The process of claim 1 wherein said lime water is a saturated solution of lime in water.

3. A process for purifying a contaminated aqueous alkali metal hydroxide solution containing a solutizer for mercaptans which solution was used to extract weak acids from a sour hydrocarbon distillate and regenerated by steam stripping whereby resinous emulsifiers accumulated in the aqueous solution comprising contacting said aqueous solution with at least an equal volume of lime water containing substantial amounts of undissolved lime, to entrain resinous emulsifier with the resulting flocculent solid, separating said flocculent solid containing entrained emulsifier from said solution, the latter having retained said solutizer for mercaptans, and reconcentrating.

4. The process of claim 3 wherein said solution is contacted with an equal volume of said lime water.

5. A process for reconditioning a contaminated aqueous alkali metal hydroxide solution having a concentration of at least 3N which solution was used to extract weak acids from a sour hydrocarbon distillate and regenerated by steam stripping whereby resinous emulsifiers accumulated in the aqueous solution, comprising contacting said aqueous solution with at least two volumes of a saturated solution of lime water, to entrain resinous emulsifier with the resulting flocculent solid, separating said flocculent solid containing entrained emulsifier from said solution and reconcentrating.

6. The process of claim 5 wherein said solution is contacted with 2 to 5 volumes of lime water.

LAWSON E. BORDER.